US008050527B2

(12) United States Patent
Noddings

(10) Patent No.: US 8,050,527 B2
(45) Date of Patent: Nov. 1, 2011

(54) SELF HEALING OPTICAL FIBER CABLE ASSEMBLY AND METHOD OF MAKING THE SAME

(75) Inventor: Kenneth C. Noddings, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 479 days.

(21) Appl. No.: 12/268,258

(22) Filed: Nov. 10, 2008

(65) Prior Publication Data
US 2010/0278491 A1 Nov. 4, 2010

(51) Int. Cl.
G02B 6/44 (2006.01)
B23P 25/00 (2006.01)
H02G 3/04 (2006.01)

(52) U.S. Cl. ........ 385/100; 385/101; 385/102; 385/141; 29/458; 174/31.5; 174/68.1

(58) Field of Classification Search .................. 385/100, 385/101, 2, 107, 109, 113, 141; 174/31.5, 174/521, 524.68, 1, 77 R, 110 R; 29/458
See application file for complete search history.

(56) References Cited

U.S. PATENT DOCUMENTS

| 5,499,311 | A * | 3/1996 | DeCusatis ..................... 385/89 |
| 6,803,400 | B1 * | 10/2004 | Butterbach et al. ........... 524/270 |
| 7,146,090 | B2 * | 12/2006 | Vo et al. .......................... 385/138 |
| 7,302,145 | B2 * | 11/2007 | Huston et al. .................. 385/100 |
| 7,501,577 | B2 * | 3/2009 | Fisher et al. ............. 174/102 SC |
| 7,569,774 | B2 * | 8/2009 | Huston et al. ............ 174/120 R |
| 7,666,503 | B2 * | 2/2010 | Easter ............................ 428/379 |
| 2006/0193569 | A1 * | 8/2006 | Huston et al. .................. 385/100 |
| 2008/0283272 | A1 * | 11/2008 | Huston et al. .......... 174/110 PM |
| 2009/0309608 | A1 * | 12/2009 | Huston et al. .................. 324/527 |
| 2010/0278491 | A1 * | 11/2010 | Noddings ..................... 385/100 |

OTHER PUBLICATIONS

Wikipedia, Optical Fiber, http://en.wikipedia.org/wiki/Optical_fiber.
Armstrong, J., et al., "Humidity Dependence of the Fatigue of High-Strength Fused Silica Optical Fibers", J. Am. Ceram. Soc., 83 (12) 3100-108 (2000).
Baker, L., "Comparison of Mechanical Reliability Models for Optical Fibers", Corning Inc., White Paper WP5049, Jun. 2001.
Castilone, R., "Mechanical Reliability: Applied Stress Design Guidelines", Corning Inc., White Paper WP5053, Aug. 2001.
Flint, S., "Failure Rates for Fiber Optic Assemblies", IIT Research Institute, RADC-TR-80-322, Final Technical Report, Oct. 1980.
Glaesemann, G., et al., "Design methodology for the mechanical reliability of optical fiber", Optical Engineering, 30 (6), 709-715, (Jun. 1991).

(Continued)

Primary Examiner — Brian Healy

(57) ABSTRACT

In one of the embodiments there is disclosed a self healing optical fiber cable assembly comprising an elongated optical fiber core having a cladding layer, a buffer layer, a sealing layer that seals any microcracks or defects in the buffer layer, the cladding layer, and the optical fiber core, and, an outer protection layer, wherein an end of the outer layer is connected to a strain relief device to provide expansion protection to the cable assembly and to minimize strain on the cable assembly, and further wherein an end of the strain relief device is connected to an optical fiber module. The cable assembly may further comprise a constraining layer and/or a strengthening layer. There is also disclosed a method of making a self healing optical fiber cable assembly.

30 Claims, 11 Drawing Sheets

OTHER PUBLICATIONS

Griffioen, W., et al., "COST 218 Evaluation of optical fibre lifetime models", Optical Materials Reliability and Testing, (1992) Proc. SPOE, vol. 1791, pp. 190-201.

Hanson, T., et al., "Incorporating multi-region crack growth into mechanical reliability predictions for optical fibers", J. Materials Science, 32, (1997) 5305-5311.

Matthewson, M., "Optical fiber reliability models", SPIE Critical Reviews of Optical Science and Technology, vol. CR50, 1993.

Matthewson, M., et al., "Cyclic fatigue of high strength optical fibers in bending", Optical Fiber and Fiber Component Mechanical Reliability and Testing, SPIE, vol. 4215, pp. 53-59, (2001).

Matthewson, M., "Environmental effects on fatigue and lifetime predictions for silica optical fibers", Proc. SPIE, 4940, 80-93 (2002).

Matthewson, M., et al., "Temperature dependence of strength and fatigue of fused silica fiber in the range 77 to 473 K", Reliability of Optical Fiber Components, Devices, Systems, and Networks, Proc. SOPIE, vol. 4940, 74-79 (2003).

Mauron P., et al., "Lifetime of Fibre Bragg Gratings Under Cyclic Fatigue", SPIE Conf. On Optical Fiber Reliability and Testing, SPIE, vol. 3848 (Sep. 1999).

Mrotek, J., et al., "The fatigue of high-strength fused silica optical fibers in low humidity", J. Non-Crystalline Solids, 297 (2002) 91-95.

Sammut, R., et al., "Axial Stress and Its Effect on Relative Strength of Polarization-Maintaining Fibers and Preforms", J. Lightwave Technology, vol. LT-3, No. 2, 283-287, Apr. 1985.

Semijonov, S., et al., "Fatigue behavior of silica fibers with different defects", Optical Fiber and Fiber Component Mechanical Reliability and Testing, Proc. SPIE, vol. 4215, 28-35, (2001).

Shiue, Y., et al., "Apparent activation energy of fused silica optical fibers in static fatigue in aqueous environments", J. Eur. Ceram. Soc., 22 (2002) 2325-2332.

Varner, J., "Fatigue and Fracture Behavior of Glasses", ASM Handbook, vol. 19, Fatigue and Fracture, p. 955, ASM International.

Volotinen, T., et al., "Mechanical Behavior and B-Value of an Abraded Optical Fiber", International Wire and Cable Symposium Proceedings, 1998, pp. 881-890.

Wan, K-T, et al., "Crack Velocity Functions and Thresholds in Brittle Solids", J. Eur. Ceram. Soc., 6 (2002) 259-268.

Wiederhorn, S., et al., "Crack Growth in Soda-Lime-Silicate Glass near the Static Fatigue Limit", J. Am. Ceram. Soc., 85 [9] 2287-92 (2002).

Wilkins, B., et al., "Static Fatigue Limit with Particular Reference to Glass", J. Am. Ceram. Soc., 59 108-112 (1976).

Yablon, A., "Optical and Mechanical Effects of Frozen-in Stresses and Strains in Optical Fibers", IEEE J. Selected Topics in Quantum Electronics, vol. 10, No. 2, 300-311, Mar./Apr. 2004.

* cited by examiner

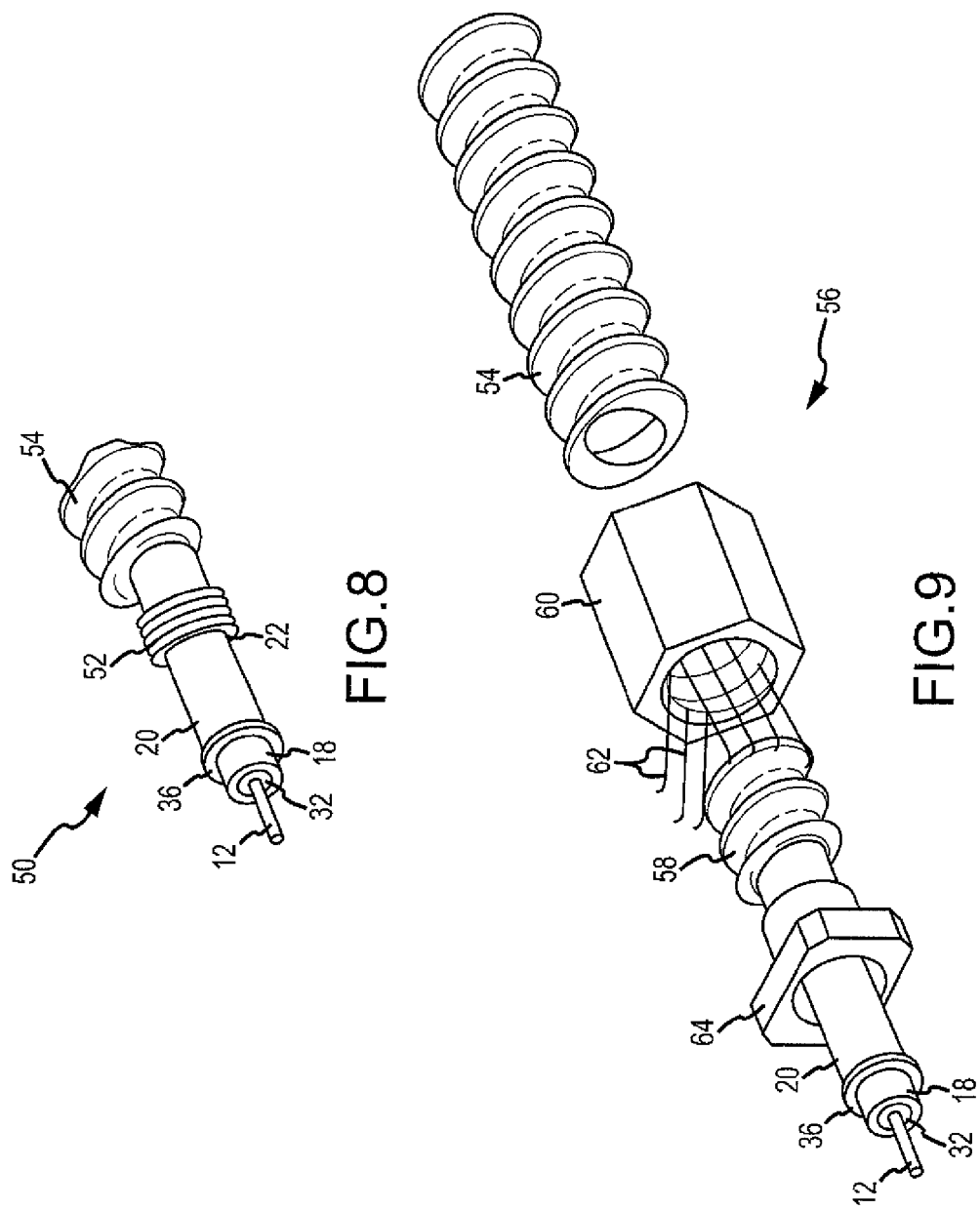

SELF HEALING OPTICAL FIBER CABLE ASSEMBLY AND METHOD OF MAKING THE SAME

GOVERNMENT RIGHTS

This invention was made with Government support under FA8808-04-C-0022 awarded by the Air Force. The government has certain rights in this invention.

BACKGROUND

1) Field of the Disclosure

The disclosure relates to optical fiber cables, and more particularly, to a self healing optical fiber cable assembly and method of making the same.

2) Description of Related Art

An optical fiber cable typically comprises a glass or plastic optical fiber that carries light along its length and various layers of protective and strengthening materials surrounding the optical fiber. Optical fiber cables are widely used in fiber optic communications which permit transmission over longer distances and at higher data rates than other forms of communications. Optical fiber cables may be used in space satellites and space environments, aircraft, sensors, light guides where bright light needs to be shone on a target without a clear line-of-sight path, imaging optics, and other suitable applications. An optical fiber is a cylindrical dielectric waveguide that transmits light along its axis by the process of total internal reflection. The fiber typically consists of a core, preferably a glass core, surrounded by a cladding layer. The cladding layer is typically used to reflect light back to the core because the cladding layer has a lower refractive index and to provide strength to the optical fiber. To confine the optical signal in the core, the refractive index of the core should preferably be greater than that of the cladding layer. With optical fiber cables, the cladding layer is typically coated with a tough resin buffer layer, which may be further surrounded by a jacket layer, usually a plastic material. These layers add strength to the fiber but do not contribute to its optical wave guide properties. Existing optical fiber cables may be assembled in a wide variety of sheathings. Optical fibers may be connected to each other by connectors or by splicing, that is, joining two optical fibers together to form a continuous optical waveguide.

Optical fiber cables can be very flexible but conventional fiber loss increases if the optical fiber cable is bent, such as the cable being bent around corners or wound around a spool. In addition, optical fiber reliability is dependant on the buffer layer and/or cladding layer damage, such as microcracks, that can grow with time when the optical fiber is exposed. Such microcracks can result in latent failures, failures in time, decreased robustness, decreased reliability, and shortened lifespan of the optical fiber and associated optical fiber cable and devices. Moreover, defects or damage to the buffer layer and/or cladding layer can occur as part of the manufacturing process, handling, and post-processing, and with time, can lead to cracks in the optical fibers. In addition, damage to the buffer layer and/or cladding layer can propagate into the optical fiber glass core. Buffer layer and/or cladding layer defects may be caused by fiber handling, mechanical motion, or rubbing, such as during the life of a space mission. Such defects may be difficult to screen out and may be a source for latent failures.

Known devices and methods exist for protecting and strengthening optical fiber cables and splices. For example, various cable protection materials may be applied around a portion of the optical fiber cables, and optical fiber splices may have protective layers or sleeves that can be heated/flowed around the splice for protection. However, such devices and methods can require additional thermal controls and/or controls on fiber routing which may result in increased complexity and costs and which may constrain the thermal environment for the optical fiber, thus resulting in decreased reliability. In addition, the cable protection materials often surround only the splice or a partial portion of the optical fiber cable and do not surround the entire length of the optical fiber cable, thus limiting the protection to the optical fiber cable. The life of an optical fiber cable is typically dependant on glass defect sizes which may be pre-screened with pull test breakage before the optical fiber cable is terminated and/or placed into an assembly/vehicle platform. Thereafter, the defects due to handling and/or mission environment may be difficult to remove or repair. Although damage or defects may be pre-screened to promote reliability, once a defect commences, time will result in failure of the optical fiber cable. Known optical fiber cables are not self healing to protect against such damage.

In addition, known optical fiber cables typically use thermal conditioning and/or mechanical and adhesive clamps or coupling devices to couple the fibers and cable components together, to achieve fiber alignment and controlled motion between the components, and to provide strain relief termination of the optical fiber cable. However, such known mechanical clamps or coupling devices may subject the optical fiber cable to excessive clamping or coupling pressure or damage, thus resulting in reduced light transmission. Moreover, insufficient thermal conditioning and/or clamping or coupling may permit undesirable movement of the optical fibers within the cable. Such movement may cause the optical fibers which are normally secured within the splice closure to "piston" in and out of the cable core. Pistoning expansion can create strain on the optical fibers and induce transmission losses. At the least, fiber bending around the splices may occur, and at the worst the optical fibers may be broken which results in devastation of the system. Such problems are particularly likely to occur in environments where significant temperature variations cause expansion and contraction, which result in clamping pressure variations.

In addition, optical fibers may also be susceptible to outgassing and decreased radiation resistance, such as may occur in aerospace applications. For example, optical fibers may be sealed and/or shielded with an adhesive or radiation resistant material, such as an epoxy/metal/ceramic material or epoxy filled with these materials, as part of an optical package. However, this can result in exposed adhesive within the intended package. Since many adhesives, such as epoxy, outgas or emit undesirable materials, such as water or solvents, this may result in contamination of the interior of the package with the resulting outgassed materials. Known methods and devices seek to avoid adhesives prone to outgassing entirely, attempt to reduce the outgassing, or remove the products of outgassing after sealing the hermetic package. However, such known methods and devices can be costly and can increase the size and weight of the optical fiber cable.

Accordingly, there is a need for a self healing optical fiber cable assembly and method of making the same that can provide advantages over known devices and methods.

SUMMARY

This need for a self healing optical fiber cable assembly and method of making the same is satisfied and numerous advantages are discussed herein. Embodiments of the self healing optical fiber cable assembly and method of making the same may provide one or more of the following advantages: provides an optical fiber cable assembly and method that is self healing, extends the life of the optical fiber cable, increases reliability, prevents complete failures, helps fiber attenuation, and minimizes pistoning expansion and microbends thereby reducing transmission losses; provides an optical fiber cable assembly and method having a very small space hardened protection cable that contains a hot melt sealing material for the entire length of the cable that flows during natural thermal excursions (i.e., where an environment provides temperatures high enough to flow the sealing material), in order to seal microcracks, damages or defects in the buffer layer, cladding layer, and/or optical fiber core; provides an optical fiber cable assembly and method for which the self healing property eliminates, minimizes, or even prevents microcrack growth and defects in the optical fiber cable and decreases latent failures and failures in time, while providing increased mission robustness, in particular, such as associated with space environments and space applications; provides an optical fiber cable assembly and method that can be used for space worthy applications, such as space satellites, spacecraft and free space laser communication systems, as well as with sensors, terrestrial applications, aircraft, vehicles, underwater communication systems, long distance communication systems, extreme environments such as down hole fiber data logging, electrical and/or fiber routing in corrosive and/or explosive environments, pyroshock test chambers, and other suitable applications; provides an optical fiber cable assembly and method that can be used with glass, plastic, or electrical metal wire fibers; provides an optical fiber cable assembly and method that enhances the reliability of the optical fiber cable for space applications in a non-invasive way without requiring excessive accommodations from a host platform, i.e., does not require additional thermal controls or controls on fiber routing; provides an optical fiber cable assembly and method with a design that minimizes the design constraints of thermal environments for the fiber to ensure reliability; provides an optical fiber cable assembly and method that can minimize outgassing and can work with radiation resistance fibers/shielding while adding little, or possibly reducing, current cable size and weight; and provides an optical fiber cable assembly and method that manages pistoning expansion while providing flow protection using composite mechanical expansion joints and/or preconditioning processes during cable assembly.

In one of the embodiments of the disclosure, there is provided a self healing optical fiber cable assembly comprising: an elongated optical fiber core having a cladding layer adjacent to and surrounding the optical fiber core; a buffer layer adjacent to and surrounding the cladding layer; a sealing layer adjacent to and surrounding the buffer layer, wherein the sealing layer seals any microcracks or defects in the buffer layer, the cladding layer, and the optical fiber core; and, an outer protection layer adjacent to and surrounding the sealing layer, wherein an end of the outer protection layer is connected to a strain relief device to provide expansion protection to the cable assembly and to minimize strain on the cable assembly, and further wherein an end of the strain relief device is connected to an optical fiber module.

In another embodiment of the disclosure, there is provided a self healing optical fiber cable assembly comprising: an elongated optical fiber core having an integrated cladding and buffer layer surrounding the optical fiber core; a sealing layer adjacent to and surrounding the integrated cladding and buffer layer, wherein the sealing layer seals any microcracks or defects in the integrated cladding and buffer layer and in the optical fiber core; a constraining layer adjacent to and surrounding the sealing layer; and, an outer protection layer adjacent to and surrounding the constraining layer, wherein an end of the outer protection layer is connected to a strain relief device to provide expansion protection to the cable assembly and to minimize strain on the cable assembly, and further wherein an end of the strain relief device is connected to an optical fiber module. The outer protection layer may be corrugated.

In another embodiment of the disclosure, there is provided a self healing optical fiber cable assembly comprising: an elongated optical fiber core having an integrated cladding and buffer layer surrounding the optical fiber core; a sealing layer adjacent to and surrounding the integrated cladding and buffer layer, wherein the sealing layer seals any microcracks or defects in the integrated cladding and buffer layer and in the optical fiber core; and, an outer protection layer adjacent to and surrounding the sealing layer, wherein an end of the outer protection layer is connected to a strain relief device to provide expansion protection to the cable assembly and to minimize strain on the cable assembly, and further wherein an end of the strain relief device is connected to an optical fiber module. The outer protection layer may be corrugated.

In another embodiment of the disclosure, there is provided a self healing optical fiber cable assembly comprising: an elongated optical fiber core having an integrated cladding and buffer layer surrounding the optical fiber core; a sealing layer adjacent to and surrounding the integrated cladding and buffer layer, wherein the sealing layer seals any microcracks or defects in the integrated cladding and buffer layer and in the optical fiber core; a constraining layer adjacent to and surrounding the sealing layer; a strengthening layer adjacent to and surrounding the constraining layer; and, an outer protection layer adjacent to and surrounding the strengthening layer, wherein an end of the outer protection layer is connected to a strain relief device to provide expansion protection to the cable assembly and to minimize strain on the cable assembly, and further wherein an end of the strain relief device is connected to an optical fiber module. The outer protection layer may be corrugated.

In another embodiment of the disclosure, there is provided a self healing optical fiber cable assembly comprising: an elongated optical fiber core having a cladding layer adjacent to and surrounding the optical fiber core; a sealing layer adjacent to and surrounding the cladding layer, wherein the sealing layer seals any microcracks or defects in the cladding layer and the optical fiber core; and, an outer protection layer adjacent to and surrounding the sealing layer, wherein an end of the outer protection layer is connected to a strain relief device to provide expansion protection to the cable assembly and to minimize strain on the cable assembly, and further wherein an end of the strain relief device is connected to an optical fiber module.

In another embodiment of the disclosure, there is provided a method for making a self healing optical fiber cable assembly comprising the steps of: providing an elongated optical fiber core having a cladding layer and a buffer layer surrounding the optical fiber core; positioning a thermal plastic outer protection layer over the surrounded optical fiber core; inserting a hot melt sealing layer over an entire length of the surrounded optical fiber core, wherein the hot melt sealing layer seals any microcracks or defects in the surrounded optical fiber core; connecting an end of the outer protection layer to a strain relief device to provide expansion protection to the cable assembly and to minimize strain on the cable assembly; and, connecting an end of the strain relief device to an optical fiber module. The method may further comprise the step of positioning a constraining layer over the surrounded optical fiber core between the surrounded optical fiber core and the outer protection layer. The method may further comprise the step of positioning a strengthening layer between the constraining layer and the outer protection layer.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 8 is an exploded perspective view of a single fiber strain relief device that can be used in the optical fiber cable assembly of the disclosure;

FIG. 9 is an exploded perspective view of another embodiment of a single fiber strain relief device that can be used in the optical fiber cable assembly of the disclosure;

DETAILED DESCRIPTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for a self healing optical fiber cable assembly and method of making the same. The self healing optical fiber cable assembly and method of the disclosed embodiments may be used in connection with various applications including, but not limited to, space worthy applications, such as space satellites, spacecraft and free space laser communication systems, as well as with sensors, terrestrial applications, aircraft, vehicles, underwater communication systems, long distance communication systems, extreme environments such as down hole fiber data logging, electrical and/or fiber routing in corrosive and/or explosive environments, pyroshock test chambers, and other suitable applications. Accordingly, one of ordinary skill in the art will recognize and appreciate that the self healing optical fiber cable assembly and method of the disclosure can be used in any number of applications involving optical fiber cables.

Figure 1:
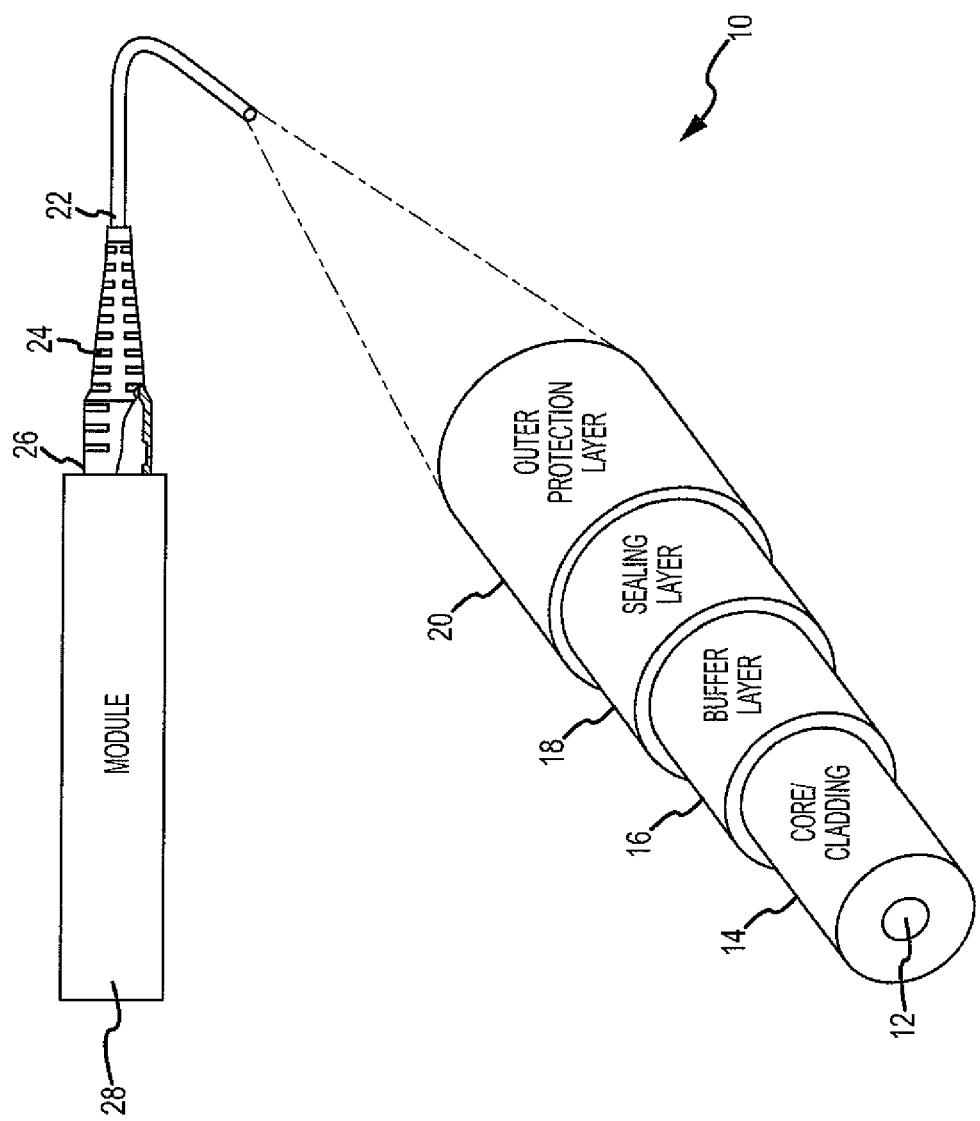
FIG. 1 is an exploded perspective view of one of the embodiments of a self healing optical fiber cable assembly of the disclosure.

FIG. 1 is an exploded perspective view of an embodiment of a self healing optical fiber cable assembly 10 of the disclosure. In this embodiment the self healing optical fiber cable assembly 10 comprises an elongated optical fiber core 12 having a cladding layer 14 adjacent to and surrounding the optical fiber core 12. The optical fiber core may be made of a material comprising glass, plastic, electrical metal wire, or another suitable material. Preferably, the optical fiber core is a glass fiber. The cladding layer is preferably a material of lower refractive index than the optical fiber core and reflects light back to the core. The cladding layer also provides strength to the optical fiber core. The cladding layer may comprise a glass material similar to the material of a glass optical fiber with slightly different refractive index doping, or other suitable materials, such as index controlled polymers or holey fiber material (having air channels). The optical fiber cable assembly 10 further comprises a buffer layer 16 adjacent to and surrounding the cladding layer 14. The buffer layer may comprise a material, such as resin, polymer, metal, and more particularly, acrylates, polyimides, sputtered aluminum or sputtered gold, or another suitable material. The buffer layer provides further protection and strength to the optical fiber core. Preferably, the optical fiber is a glass fiber with a cladding layer and polymer buffer layer, such as the CORNING SMF-28E optical fiber, obtained from Corning Incorporated of Corning, N.Y. The optical fiber cable assembly further comprises a sealing layer 18 adjacent to and surrounding the buffer layer 16. The sealing layer 18 is a protective material that seals any microcracks, damage or defects in the buffer layer, the cladding layer, and/or the optical fiber core. The sealing layer material preferably comprises a hot melt thermal plastic material that can be formed/extruded into a tubular shape, such as ethylene vinyl acetate (EVA), or another suitable thermal plastic material that can be formed/extruded into a tubular shape and flow at the required temperatures and do this without creating harmful stresses or strains on the optical fiber. The preferred properties of the sealing layer material include that the material can readily slide or be applied over the surrounded optical fiber (fiber core/cladding/buffer layer), that the material flows under approximately 80 degrees C. to promote self healing coverage of defects, and does this while minimizing thermal strain that can cause pistoning (microbending) which can induce transmission losses, which is dependent on geometry and composite mechanics associated with the interface with an outer protection layer (discussed below). The sealing layer material softens with constrained flow to force material into the defect areas of the buffer layer, cladding layer, and/or optical fiber, but at the same time must minimize thermal induced strain across the optical fiber cable during a mission temperature profile. A more preferred sealing layer material used may comprise ethylene vinyl acetate (EVA) hot melt tubing obtained from DuPont of Wilmington, Del. The percentage of vinyl acetate typically determines the melt temperature as well as other properties. The outer diameter of the sealing layer tubing may preferably be in the range of about 500 microns to about 900 microns. More preferably, the outer diameter of the sealing layer may be 590 microns. The sealing layer is preferably adjacent an entire length of the buffer layer, as well as encompasses an entire length of the fiber optic core and entire length of the cladding layer. The hot melt sealing layer can be applied along the entire optical fiber cable. In addition, natural thermal excursions can be used to flow the hot melt sealing layer to repair and seal damages and defects. Preferably, the hot melt sealing material seals the buffer defects first, before they propagate to a bare portion of the optical fiber. However, if the bare portion is exposed, then the hot melt sealing material seals and adheres to the bare portion as well. Buffer defects are typically caused by fiber handling, which can happen at any time, and mechanical motion or rubbing during the life of a mission. Such defects are difficult to screen out and are a source for latent failures, for which the self healing property of the disclosed optical fiber cable prevents, minimizes, eliminate, and corrects such defects. The life of an optical fiber cable may be dependent on defect sizes, which can be screened with pull test breakage before the optical fiber cable is terminated and/or placed into an assembly/vehicle platform. After that, the defects due to handling and/or mission environment cannot typically be removed or repaired. Therefore, if a significant defect occurs just before operation, then the sealing property can increase the lifetime from immediate failure to end of the mission life. The self healing property can stop defect growth and the optical fiber cable can become virtually failure free enabling it to last many mission lifetimes.

The optical fiber cable assembly further comprises an outer protection layer 20 or jacket adjacent to and surrounding the sealing layer 18. The outer protection layer is preferably made of a hardened protective material to provide further protection and strength to the optical fiber core. The outer protection layer preferably comprises a thermal plastic material, such as polyetheretherketone (PEEK), ethylene tetrafluoroethylene (ETFE), polyvinylidene fluoride (PVDF), or another suitable material. A more preferred outer layer portion used may comprise polyetheretherketone (PEEK) heat shrink tubing obtained from Texlock of San Bernardino, Calif., or from Zeus of Orangeburg, S.C. The outer diameter of the outer layer portion or tubing may preferably be about 900 microns and the inner diameter of the outer layer portion or tubing may preferably be about 645 microns. The diameter of the optical fiber cable of the disclosed embodiments may preferably be from about 600 microns to about 1000 microns. However, other suitable diameters may also be used. For example, the optical fiber cable shown in FIG. 1, with the optical fiber core and cladding layer, buffer layer, sealing layer and outer protection layer, preferably has an outer diameter of 900 microns. An end 22 of the outer protection layer 20 may be connected to a strain relief device 24. The strain relief device 24 can provide expansion protection to the cable assembly and can minimize strain on the cable assembly. Examples of various strain relief devices are discussed in further detail below. An end 26 of the strain relief device 24 may be connected to an optical fiber module 26. The optical fiber module may be a compartment or box that contains optical components (not shown), such as laser transmitters, optical interferometers, variable optical attenuators, and/or switches or optical enclosures/splices/units, that may modify and route transmitted signals to and from the optical fiber cable.

Figure 2:
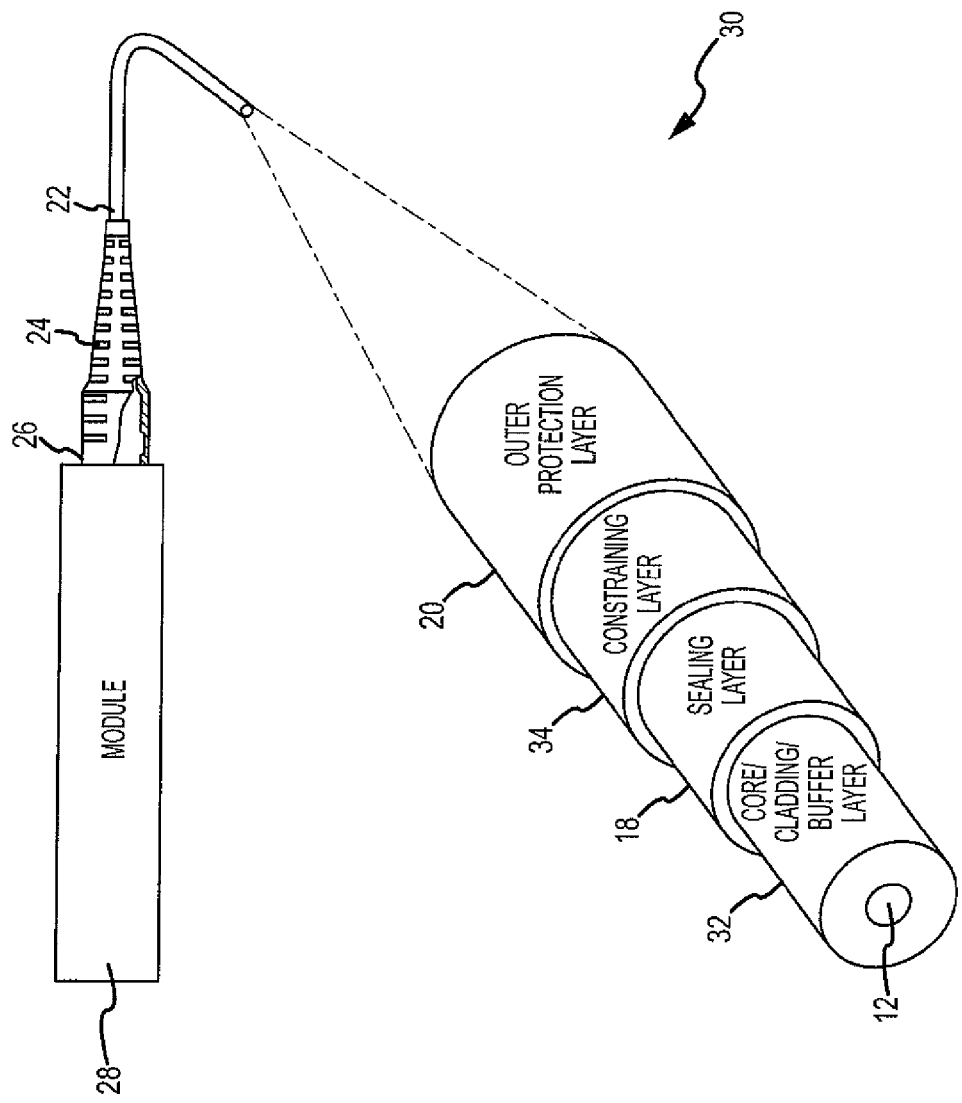
FIG. 2 is an exploded perspective view of another embodiment of a self healing optical fiber cable assembly of the disclosure.
Figure 3:
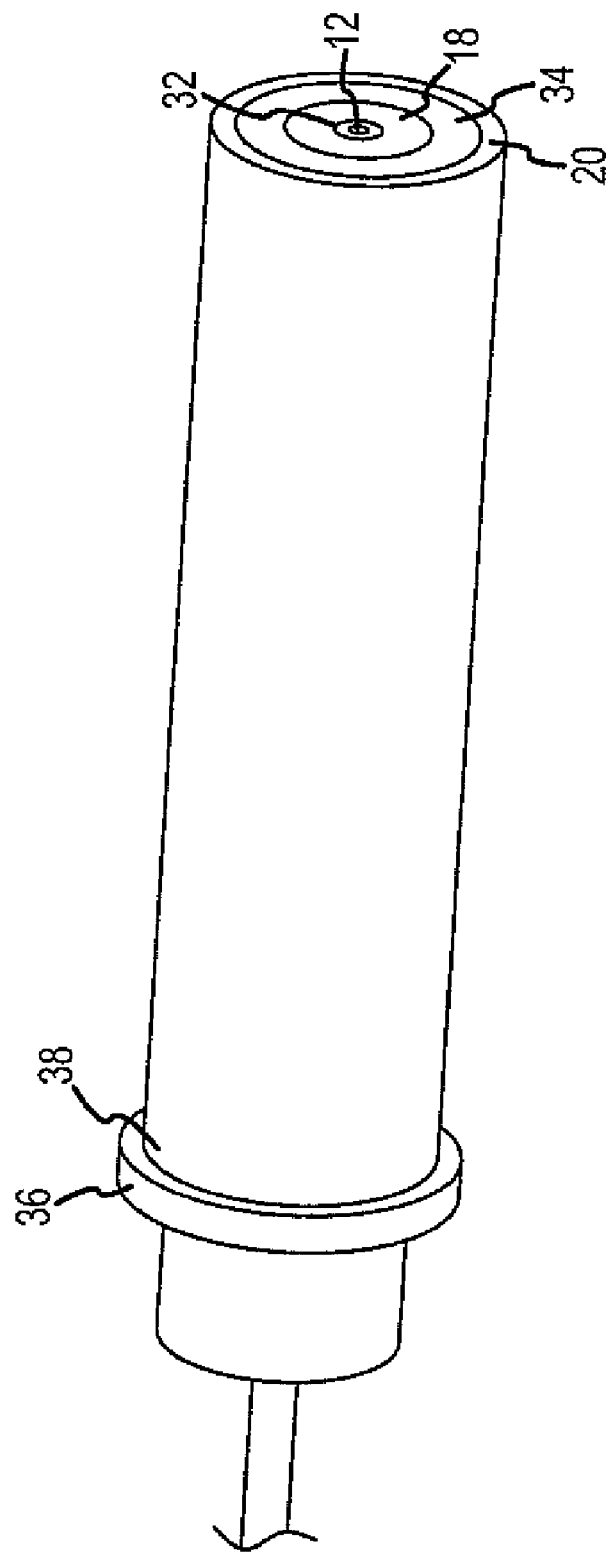
FIG. 3 is a perspective side view of the optical fiber cable of FIG. 2.

FIG. 2 is an exploded perspective view of another embodiment of an optical fiber cable assembly 30 of the disclosure. The self healing optical fiber cable assembly 30 comprises the elongated optical fiber core 12. The optical fiber core may comprise the same materials as discussed in connection with the optical fiber core of FIG. 1. In this embodiment the optical fiber core 12 has an integrated cladding and buffer layer 32 surrounding the optical fiber core 12. The integrated cladding and buffer layer 32 integrates or attaches a cladding layer and a buffer layer together, rather than having a separate cladding layer and a separate buffer layer as shown in FIG. 1. The integrated cladding and buffer layer 32 may comprise the same materials as discussed in connection with the separate cladding layer and buffer layer of FIG. 1. A preferred integrated cladding and buffer layer surrounding the optical fiber core may be obtained from Corning Incorporated of Corning, N.Y., where the cladding layer may have an outer diameter of about 125 microns and the buffer layer may have an outer diameter of about 250 microns. The self healing optical fiber further comprises the sealing layer 18 adjacent to and surrounding the integrated cladding and buffer layer 32. The sealing layer may comprise the same materials as discussed in connection with the sealing layer of FIG. 1. The sealing layer 18 seals any microcracks or defects in the integrated cladding and buffer layer 32 and in the optical fiber core 12. This embodiment further comprises a constraining layer 34 adjacent to and surrounding the sealing layer 18. The constraining layer 34 is preferably positioned between the sealing layer 18 and the outer protection layer 20. The constraining layer preferably constrains and helps to direct the flow of the sealing layer material into the damaged or defect areas. The constraining layer may also create relative movement or a slip plane or glide plane between the layers. The constraining layer may comprise a thermal plastic, polymeric material, such as polyolefin, polyolefin copolymer, ethylene vinyl acetate (EVA), heat shrink polyetheretherketone (PEEK), polyvinylidene fluoride (PVDF), or another suitable material. A more preferred constraining layer used may comprise polyolefin heat shrink copolymer obtained from Splice Technologies, Inc. of Yaphank, N.Y., where the constraining layer preferably has an outer diameter of about 600 microns. The outer protection layer 20 or jacket is adjacent to and surrounding the constraining layer 34. The outer protection layer may comprise the same materials as discussed in connection with the outer protection layer of FIG. 1. The outer protection layer end 22 is connected to the strain relief device 24 to provide expansion protection to the cable assembly and to minimize strain on the cable assembly. The end 26 of the strain relief device 24 is connected to the optical fiber module 28. FIG. 3 is a perspective side view of the optical fiber cable assembly of FIG. 2 with additional strain relief in the form of a flared or flange end 36 on a portion 38 of the outer protection layer. The flared or flange end 36 also facilitates clamping attachment. FIG. 3 shows the optical fiber core 12, the integrated cladding and buffer layer 32, the sealing layer 18, the constraining layer 34, the outer protection layer 20, and the flared or flange end 36 on the portion 38 of the outer protection layer. The flared or flange end provides additional strain relief, clamping attachment, and long length joining or coupling.

Figure 4:
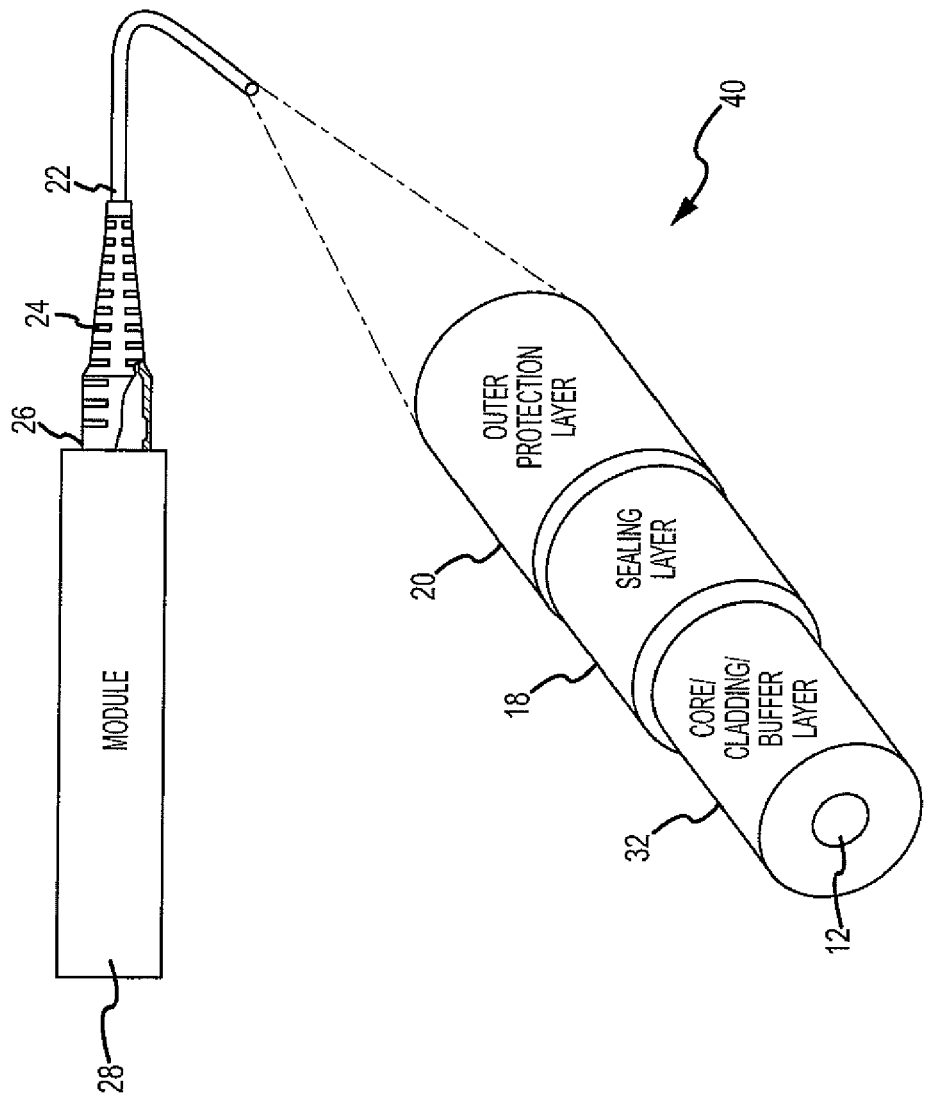
FIG. 4 is an exploded perspective view of another embodiment of a self healing optical fiber cable assembly of the disclosure.

FIG. 4 is an exploded perspective view of another embodiment of a self healing optical fiber cable assembly 40 of the disclosure. The self healing optical fiber cable assembly 40 comprises the elongated optical fiber core 12 with the integrated cladding and buffer layer 32 surrounding the optical fiber core 12. The sealing layer 18 is adjacent to and surrounding the integrated cladding and buffer layer 32. The sealing layer is adjacent an entire length of the integrated cladding and buffer layer 32. The sealing layer 18 seals any microcracks or defects in the integrated cladding and buffer layer 32 and in the optical fiber core 12. The outer protection layer 20 is adjacent to and surrounds the sealing layer 18. The end 22 of the outer protection layer 20 is connected to the strain relief device 24 to provide expansion protection to the cable assembly and to minimize strain on the cable assembly. The end 26 of the strain relief device 24 is connected to the optical fiber module 28. It should be noted that the particulars relating to the sealing layer and outer protection layer of the embodiment of FIG. 1 and the integrated cladding and buffer layer of the embodiment of FIG. 2, as described above, apply with equal force to the particulars of this embodiment.

Figure 5:
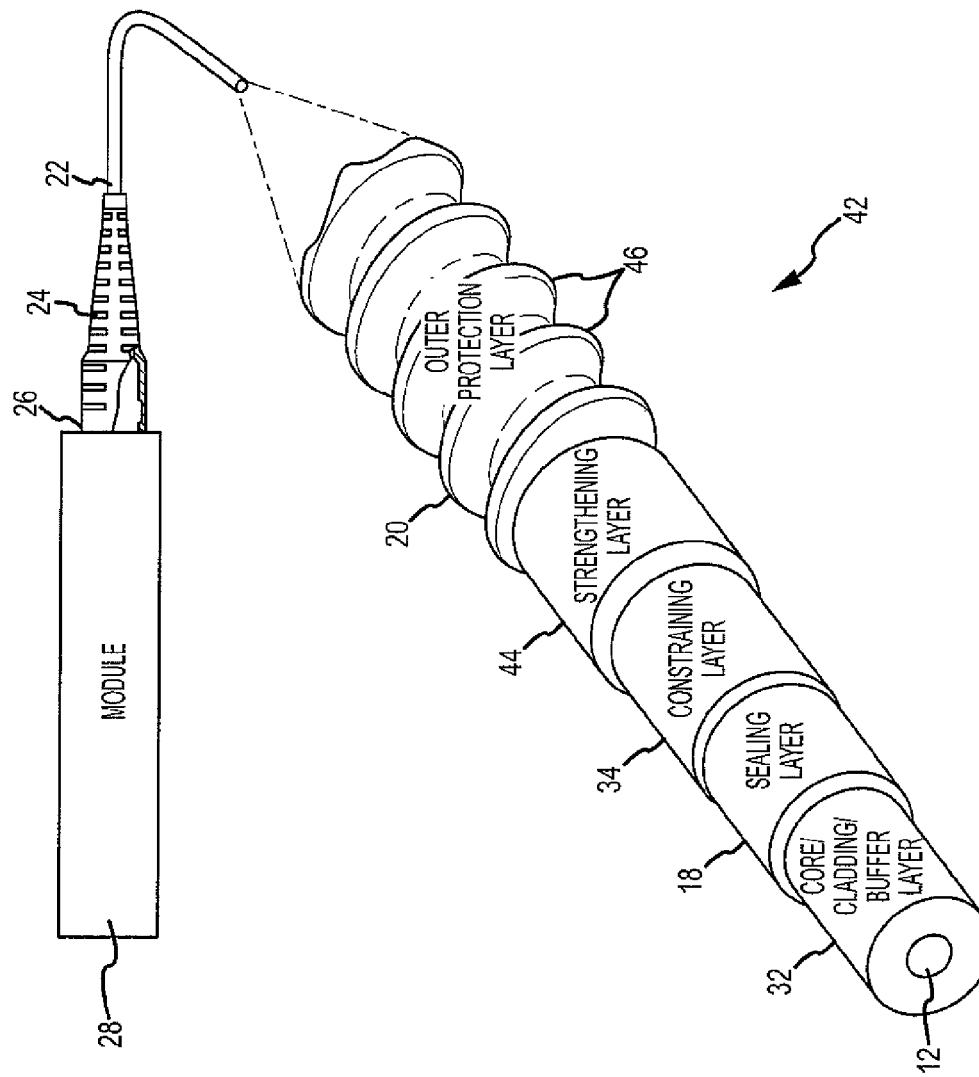
FIG. 5 is an exploded perspective view of another embodiment of a self healing optical fiber cable assembly of the disclosure.

FIG. 5 is an exploded perspective view of another embodiment of a self healing optical fiber cable assembly 42 of the disclosure. The self healing optical fiber cable assembly 42 comprises the elongated optical fiber core 12 with the integrated cladding and buffer layer 32 surrounding the optical fiber core 12. The sealing layer 18 is adjacent to and surrounding an entire length of the integrated cladding and buffer layer 32. The sealing layer seals any microcracks or defects in the integrated cladding and buffer layer and in the optical fiber core. The cable assembly further comprises the constraining layer 34 adjacent to and surrounding the sealing layer 18. In this embodiment the cable assembly further comprises a strengthening layer 44 adjacent to and surrounding the constraining layer 34. The strengthening layer 44 preferably comprises an aramid fiber material, such as poly paraphenylene terephthalamide (KEVLAR) (KEVLAR is a registered trademark of DuPont of Wilmington, Del.), a weavable fiber such as graphite or fiber glass, or another suitable material. The cable assembly further comprises the outer protection layer 20 which is adjacent to and surrounding the strengthening layer 44. In this embodiment the outer protection layer may be corrugated and may have corrugations 46 as shown in FIG. 5. The end 22 of the outer protection layer 20 may be connected to the strain relief device 24 to provide expansion protection to the cable assembly and to minimize strain on the cable assembly. The end 26 of the strain relief device 24 may be connected to the optical fiber module 28. It should be noted that the particulars relating to the sealing layer and outer protection layer of the embodiment of FIG. 1 and the integrated cladding and buffer layer and constraining layer of the embodiment of FIG. 2, as described above, apply with equal force to the particulars of this embodiment.

Figure 6:
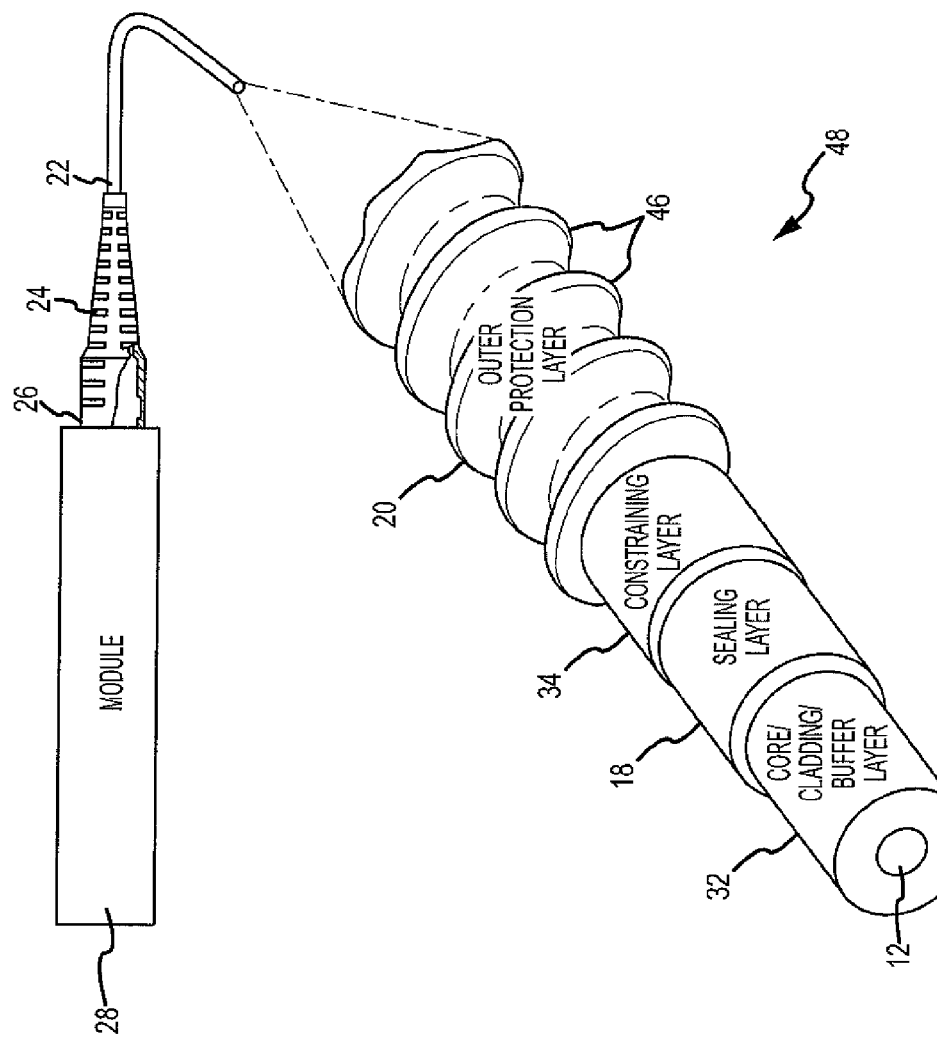
FIG. 6 is an exploded perspective view of another embodiment of a self healing optical fiber cable assembly of the disclosure.

FIG. 6 is an exploded perspective view of another embodiment of a self healing optical fiber cable assembly 48 of the disclosure. This embodiment is similar to the embodiment in FIG. 2 except that the outer protection layer 20 is corrugated and has corrugations 46. FIG. 6 shows the optical fiber core 12, the integrated cladding and buffer layer 32, the sealing layer 18, the constraining layer 34, and the outer protection layer 20. The end 22 of the outer protection layer 20 may be connected to the strain relief device 24 to provide expansion protection to the cable assembly and to minimize strain on the cable assembly. The end 26 of the strain relief device 24 may be connected to the optical fiber module 28. It should be noted that the particulars relating to the sealing layer and outer protection layer of the embodiment of FIG. 1 and the integrated cladding and buffer layer and constraining layer of the embodiment of FIG. 2, as described above, apply with equal force to the particulars of this embodiment.

Figure 7:
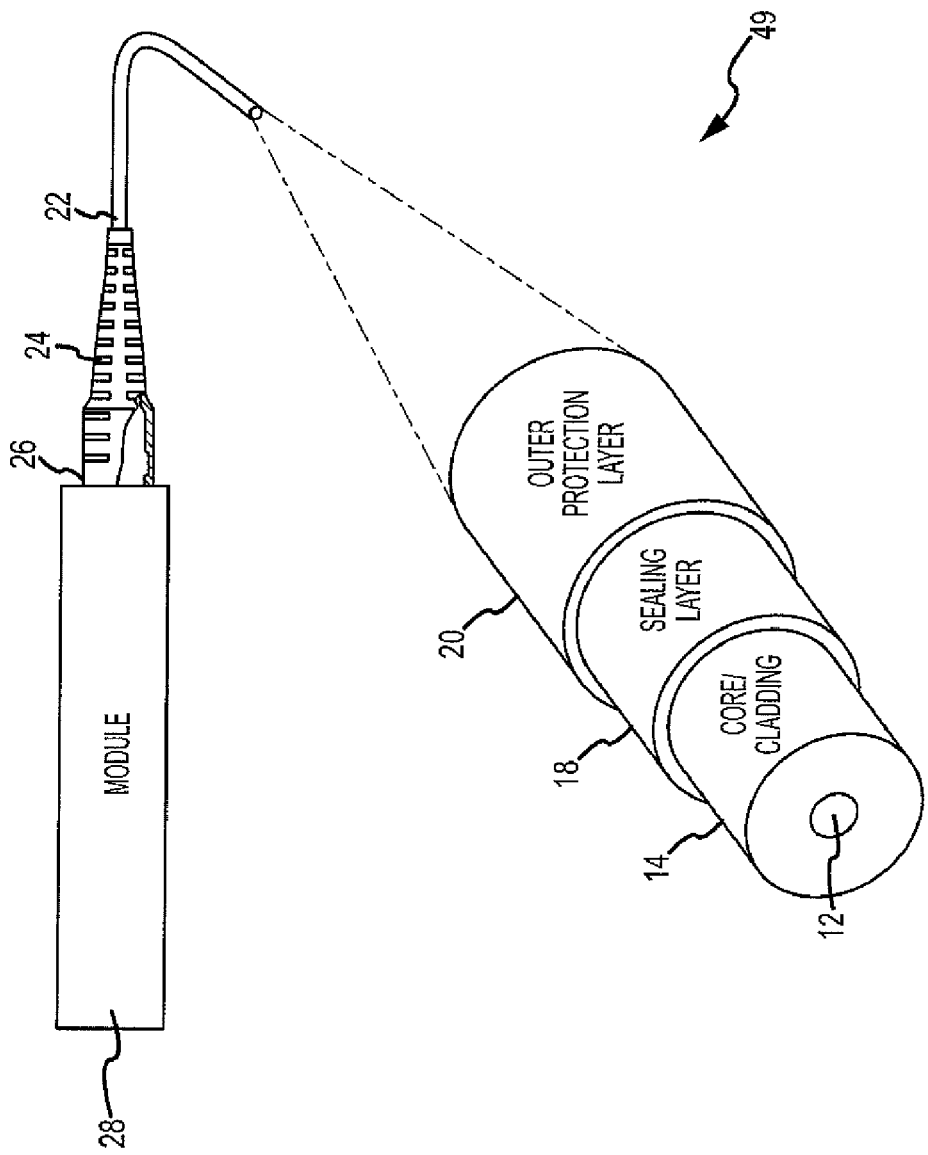
FIG. 7 is an exploded perspective view of another embodiment of a self healing optical fiber cable assembly of the disclosure.

FIG. 7 is an exploded perspective view of another embodiment of a self healing optical fiber cable assembly 49 of the disclosure. This embodiment is similar to the embodiment in FIG. 1 except that there is no buffer layer in this embodiment. FIG. 7 shows the optical fiber core 12, the cladding layer 14, the sealing layer 18, and the outer protection layer 20. In this embodiment, the sealing layer may act as a buffer layer to protect the optical fiber core and cladding layer. The end 22 of the outer protection layer 20 may be connected to the strain relief device 24 to provide expansion protection to the cable assembly and to minimize strain on the cable assembly. The end 26 of the strain relief device 24 may be connected to the optical fiber module 28. It should be noted that the particulars relating to the cladding layer, sealing layer, and outer protection layer of the embodiment of FIG. 1, as described above, apply with equal force to the particulars of this embodiment.

The embodiments of the optical fiber cables as shown in FIG. 1-7 may be used with various strain relief and coupling devices, such as those shown in FIGS. 8-13. The strain relief devices provide expansion protection to the optical fiber cable assembly and minimize strain on the optical fiber cable assembly, such as by minimizing pistoning of the optical fiber cable assembly. Proper strain relief termination at or on the outer protection layer minimizes pistoning strain to minimize or prevent stress on the optical fiber. The outer protection layer is preferably terminated on either end with a strain relief device. The optical fiber cable may be connected to the strain relief device or strain relief boot with an adhesive, such as an epoxy, and crimped with expansion protection. Additional strain relief devices may also be added to the outer protection layer, or the outer protection layer may have one or more built-in expansion joints or portions to aid in expansion protection and minimize pistoning of the optical fiber cable assembly, while providing flow protection using composite mechanical expansion joints. Depending on the cable length, additional expansion joints may need to be added to further minimize pistoning. For example, the outer protection layer may comprise corrugated tubing with corrugations 46 along the length of the outer protection layer (see FIGS. 5-6) to provide built-in expansion protection and flexibility. In addition, the outer protection layer may include additional strain relief devices, such as flared or flange ends 36 (see FIG. 3), slits (not shown), or other suitable expansion joints.

FIG. 8 is an exploded perspective view of a single fiber strain relief device 50 that can be used with various embodiments of the optical fiber cable assembly of the disclosure. The strain relief device 50 is preferably attached to the end 22 of the outer protection layer via a threaded feedthrough element 52 which is coupled to a corrugated tubing expansion element 54. Flare or flange end 36 can also be coupled to the outer protection layer 20.

Figure 10:
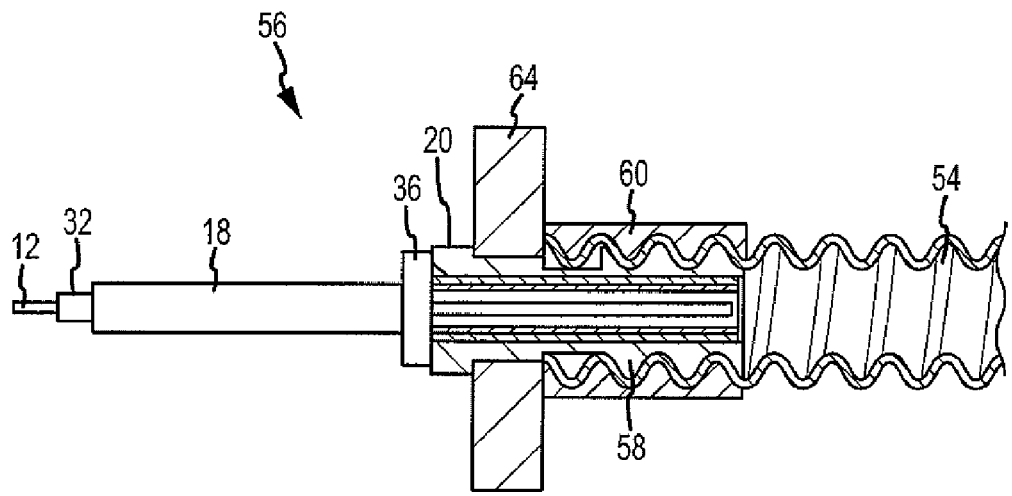
FIG. 10 is a cut-away side view of the single fiber strain relief device of FIG. 9.

FIG. 9 is an exploded perspective view of another embodiment of a single fiber strain relief device 56 that can be used with various embodiments of the optical fiber cable assembly of the disclosure. The strain relief device 56 may comprise flange or flare end 36, screw fitting 58, nut fitting 60, corrugated tubing expansion element 54, strengthening fibers 62 (preferably made of KEVLAR), and module panel 64. FIG. 10 is a cut-away side view of the single fiber strain relief device 56 of FIG. 9 showing flange or flare end 36, screw fitting 58, nut fitting 60, corrugated tubing expansion element 54, and module panel 64.

Figure 11:
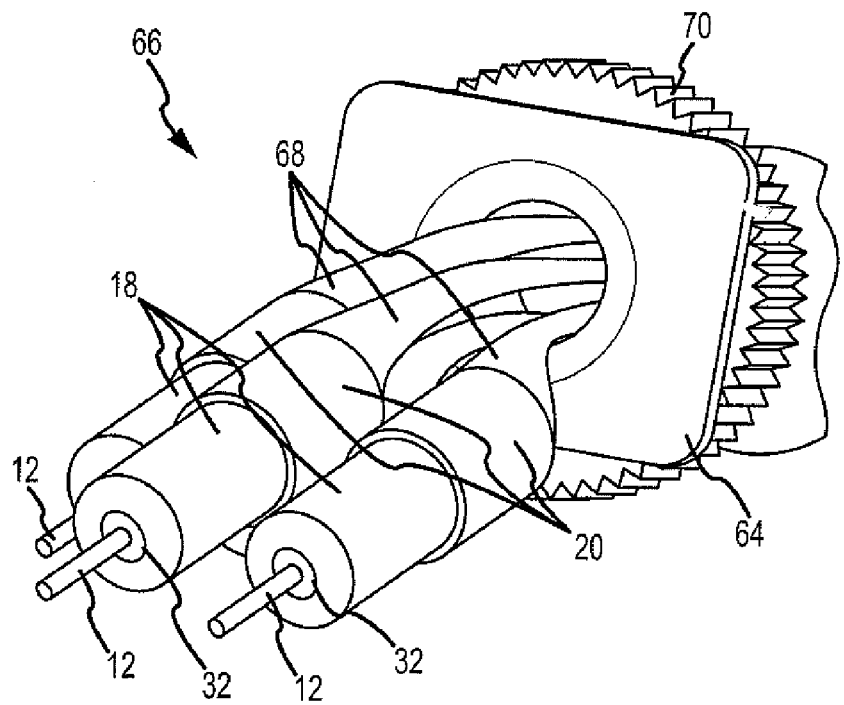
FIG. 11 is an exploded perspective view of a multiple fiber strain relief device that can be used in the optical fiber cable assembly of the disclosure.

FIG. 11 is an exploded perspective view of a multiple fiber strain relief device 66 that can be used with various embodiments of the optical fiber cable assembly of the disclosure. The multiple fiber strain relief device 66 may comprise multiple optical fiber cables 68, module panel 64, and nut 70. The optical fiber 12 is shown stripped of protection in order to make a fusion splice.

Figure 12:
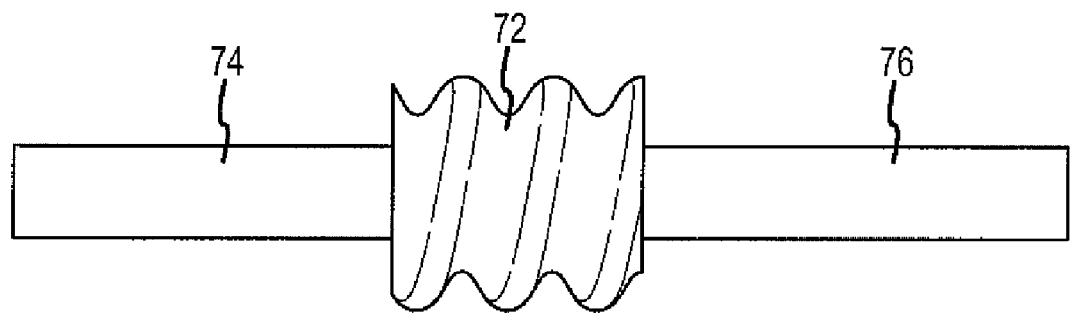
FIG. 12 a side view of one of the embodiments of a coupling element that can be used in the optical fiber cable assembly of the disclosure.

FIG. 12 a side view of one of the embodiments of a coupling element 72 that can be used with various embodiments of the optical fiber cable assembly of the disclosure. The coupling element 72 is shown coupling or joining optical fiber cables 74 and 76. The coupling element may be used to couple or join two or more self healing optical fiber cables in order to provide stress and strain relief points.

Figure 13:
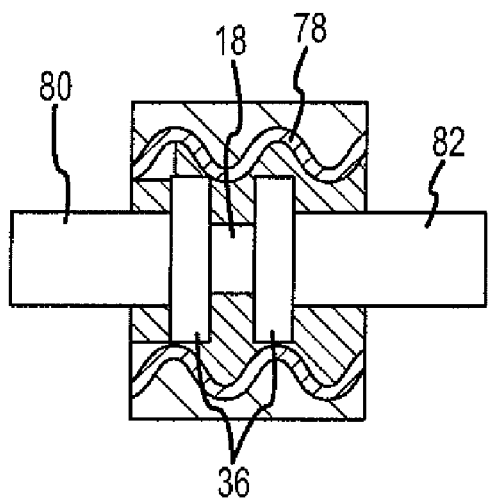
FIG. 13 is a cut-away side view of another embodiment of a coupling element showing flange ends that can be used in the optical fiber cable assembly of the disclosure; and, FIG. 14 is a block flow diagram of one of the embodiments of the method of the disclosure.

FIG. 13 is a cut-away side view of another embodiment of a coupling element 78 that can be used with various embodiments of the optical fiber cable assembly of the disclosure. The coupling element 78 is shown coupling or joining optical fiber cables 80 and 82, each having flange or flare ends 36. The sealing layer material 18 is shown in an exposed state. The coupling element may be used to couple or join two or more self healing optical fiber cables in order to provide stress and strain relief points.

Thermal conditioning techniques may also be used to minimize strain. For example, a cable processing technique that can be used includes after the optical fiber cable is cut to a proper length, it then goes through a series of strain relief thermal cycles before it is terminated to connectors, couplers, or feedthrough elements. Also after the terminated optical fiber cable is set or positioned in place, at least one thermal cycle may be conducted to relax the bending stresses. This process may also be used to activate or flow the hot melt sealing material.

Figure 14:
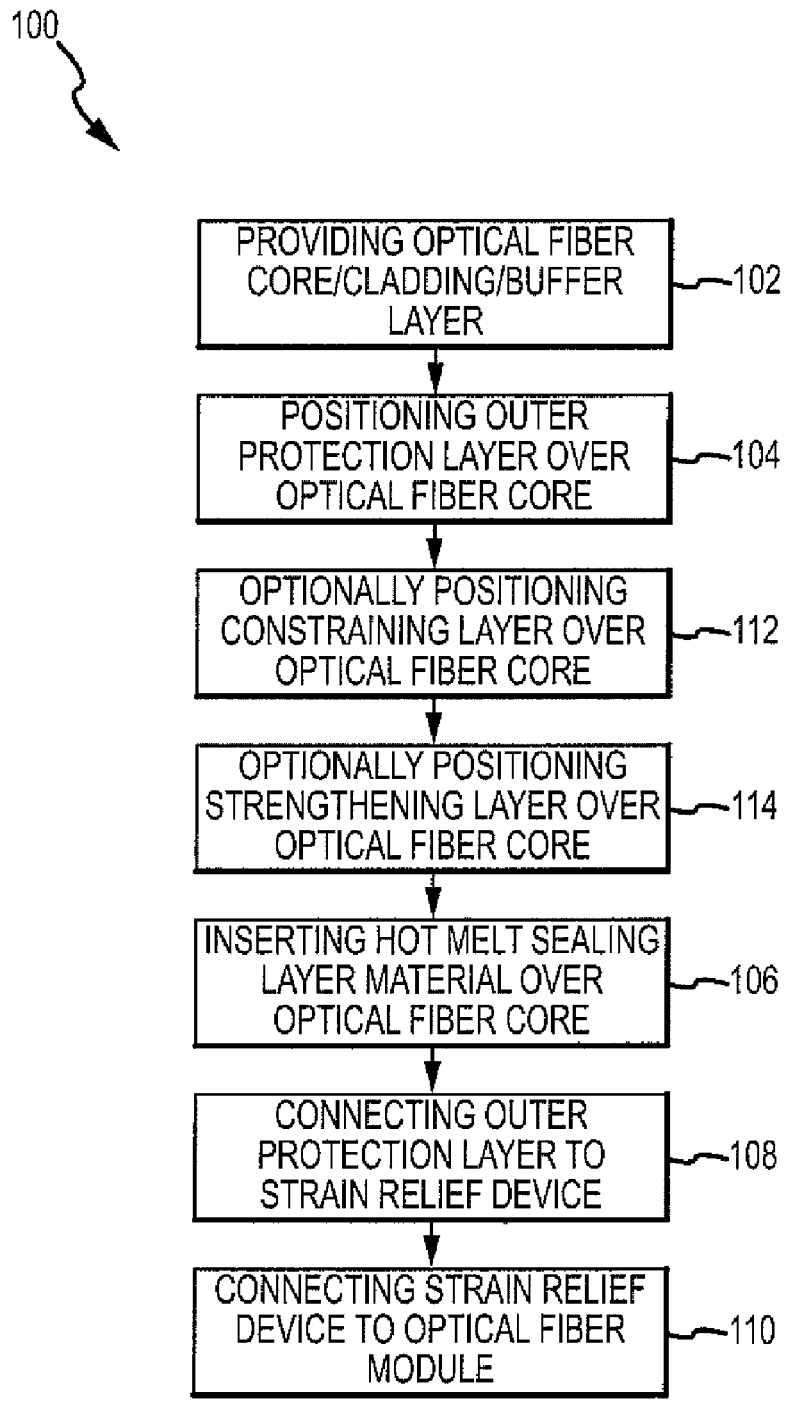

FIG. 14 is a block flow diagram of one of the embodiments of a method 100 of the disclosure. One of the embodiments of the method 100 for making a self healing optical fiber cable assembly comprises the step 102 of providing an elongated optical fiber core having a cladding layer and a buffer layer surrounding the optical fiber core. The method further comprises the step 104 of positioning a thermal plastic outer protection layer or jacket over the surrounded optical fiber core. The method further comprises the step 106 of inserting a hot melt sealing layer material over an entire length of the surrounded optical fiber core, wherein the hot melt sealing material seals any microcracks or defects in the surrounded optical fiber core. The method further comprises the step 108 of connecting an end of the outer protection layer or jacket to a strain relief device to provide expansion protection to the cable assembly and to minimize strain on the cable assembly. The method further comprises the step 110 of connecting an end of the strain relief device to an optical fiber module. The method may further comprise the step 112 after the step of positioning the thermal plastic outer protection layer or jacket over the surrounded optical fiber core, of positioning a constraining layer or jacket over the surrounded optical fiber core between the surrounded optical fiber core and the outer protection layer. The method may further comprises the step 114 after the step of positioning the constraining layer or jacket over the surrounded optical fiber core, of positioning a strengthening layer or jacket between the constraining layer or jacket and the outer protection layer or jacket. The optical fiber core may comprise glass, plastic, electrical metal wire, or another suitable material. Preferably, the optical fiber core is glass. The hot melt sealing material preferably comprises a hot melt thermal plastic material that can be formed/extruded into a tubular shape, such as ethylene vinyl acetate (EVA), or another suitable thermal plastic material that can be formed/extruded into a tubular shape and flow at the required temperatures and do this without creating harmful stresses or strains on the optical fiber. The outer protection layer is preferably made of a hardened protective material to provide further protection and strength to the optical fiber core. The outer protection layer preferably comprises a thermal plastic material, such as polyetheretherketone (PEEK), ethylene tetrafluoroethylene polyvinylidene fluoride (PVDF), or another suitable material. The constraining layer may comprise a thermal plastic, polymeric material, such as polyolefin, polyolefin copolymer, ethylene vinyl acetate (EVA), heat shrink polyetheretherketone (PEEK), polyvinylidene fluoride (PVDF), or another suitable thermal plastic, polymeric material. The strengthening layer preferably comprises an aramid fiber material, such as poly paraphenylene terephthalamide (KEVLAR), a weavable fiber such as graphite or fiber glass, or another suitable material. It should be noted that the particulars relating to the embodiments, as described above, apply with equal force to the particulars of this embodiment.

The self healing optical fiber cable assembly and method of the disclosure can extend the reliability and the lifetime of the optical fiber cable assembly and minimize or prevent handling defects that may not be screened properly. The self healing optical fiber cable assembly and method of the disclosure preferably uses a hot melt sealing material that flows during natural thermal excursions to seal defects or damage in the buffer layer, the cladding layer and the optical fiber, thereby minimizing, preventing, or correcting such defects or damage, including microcrack growth, and resulting in decreased latent failures and failures in time, while providing increased mission robustness associated with space environments and other applications. The disclosed optical fiber cable assembly may be used for space operations/environments to minimize outgassing and has the ability to work with radiation resistance fibers/shielding while adding little, or possibly reducing, current cabling size and weight.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. A self healing optical fiber cable assembly comprising:
an elongated optical fiber core having a cladding layer adjacent to and surrounding the optical fiber core;
a buffer layer adjacent to and surrounding the cladding layer;
a sealing layer adjacent to and surrounding the buffer layer, wherein the sealing layer seals any microcracks or defects in the buffer layer, the cladding layer, and the optical fiber core, and further wherein the sealing layer comprises a hot melt thermal plastic material comprising ethylene vinyl acetate (EVA); and,
an outer protection layer adjacent to and surrounding the sealing layer, wherein an end of the outer layer is connected to a strain relief device to provide expansion protection to the cable assembly and to minimize strain on the cable assembly, and further wherein an end of the strain relief device is connected to an optical fiber module.

2. The assembly of claim 1 wherein the optical fiber core comprises a material selected from the group consisting of glass, plastic, and electrical metal wire.

3. The assembly of claim 1 wherein the buffer layer comprises a material selected from the group consisting of resin, polymer, metal, acrylates, polyimides, sputtered aluminum, and sputtered gold.

4. The assembly of claim 1 wherein the sealing layer is adjacent an entire length of the buffer layer.

5. The assembly of claim 1 wherein the outer protection layer comprises a thermal plastic material selected from the group consisting of polyetheretherketone (PEEK), ethylene tetrafluoroethylene (ETFE), and polyvinylidene fluoride (PVDF).

6. The assembly of claim 1 further comprising a constraining layer between the sealing layer and the outer protection layer, wherein the constraining layer comprises a polymeric material selected from the group consisting of polyolefin, polyolefin copolymer, ethylene vinyl acetate (EVA), heat shrink polyetheretherketone (PEEK), and polyvinylidene fluoride (PVDF).

7. The assembly of claim 6 further comprising a strengthening layer between the constraining layer and the outer protection layer, wherein the strengthening layer comprises a fiber material selected from the group consisting of poly paraphenylene terephthalamide, graphite, and fiber glass.

8. A self healing optical fiber cable assembly comprising:
an elongated optical fiber core having an integrated cladding and buffer layer surrounding the optical fiber core;
a sealing layer adjacent to and surrounding the integrated cladding and buffer layer, wherein the sealing layer seals any microcracks or defects in the integrated cladding and buffer layer and in the optical fiber core and further wherein the sealing layer comprises a hot melt thermal plastic material comprising ethylene vinyl acetate (EVA);
a constraining layer adjacent to and surrounding the sealing layer; and,
an outer protection layer adjacent to and surrounding the constraining layer, wherein an end of the outer layer is connected to a strain relief device to provide expansion protection to the cable assembly and to minimize strain on the cable assembly, and further wherein an end of the strain relief device is connected to an optical fiber module.

9. A self healing optical fiber cable assembly comprising:
an elongated optical fiber core having an integrated cladding and buffer layer surrounding the optical fiber core;
a sealing layer adjacent to and surrounding the integrated cladding and buffer layer, wherein the sealing layer seals any microcracks or defects in the integrated cladding and buffer layer and in the optical fiber core;
a constraining layer adjacent to and surrounding the sealing layer; and,
an outer protection layer adjacent to and surrounding the constraining layer, wherein the outer protection layer is corrugated and wherein an end of the outer layer is connected to a strain relief device to provide expansion protection to the cable assembly and to minimize strain on the cable assembly, and further wherein an end of the strain relief device is connected to an optical fiber module.

10. The assembly of claim 8 wherein the optical fiber core comprises a material selected from the group consisting of glass, plastic, and electrical metal wire.

11. The assembly of claim 8 wherein the sealing layer is adjacent an entire length of the integrated cladding and buffer layer.

12. The assembly of claim 8 further comprising a constraining layer between the sealing layer and the outer protection layer, wherein the constraining layer comprises a polymeric material selected from the group consisting of polyolefin, polyolefin copolymer, ethylene vinyl acetate (EVA), heat shrink polyetheretherketone (PEEK), and polyvinylidene fluoride (PVDF).

13. The assembly of claim 8 wherein the outer protection layer comprises a thermal plastic material selected from the group consisting of polyetheretherketone (PEEK), ethylene tetrafluoroethylene (ETFE), and polyvinylidene fluoride (PVDF).

14. A self healing optical fiber cable assembly comprising:
an elongated optical fiber core having an integrated cladding and buffer layer surrounding the optical fiber core;
a sealing layer adjacent to and surrounding the integrated cladding and buffer layer, wherein the sealing layer seals any microcracks or defects in the integrated cladding and buffer layer and in the optical fiber core, and further wherein the sealing layer comprises a hot melt thermal plastic material comprising ethylene vinyl acetate (EVA); and,
an outer protection layer adjacent to and surrounding the sealing layer, wherein an end of the outer layer is connected to a strain relief device to provide expansion protection to the cable assembly and to minimize strain on the cable assembly, and further wherein an end of the strain relief device is connected to an optical fiber module.

15. The assembly of claim 14 wherein the sealing layer is adjacent an entire length of the integrated cladding and buffer layer.

16. A self healing optical fiber cable assembly comprising:
an elongated optical fiber core having an integrated cladding and buffer layer surrounding the optical fiber core;
a sealing layer adjacent to and surrounding the integrated cladding and buffer layer, wherein the sealing layer seals any microcracks or defects in the integrated cladding and buffer layer and in the optical fiber core, and further wherein the sealing layer comprises a hot melt thermal plastic material comprising ethylene vinyl acetate (EVA);
a constraining layer adjacent to and surrounding the sealing layer; a strengthening layer adjacent to and surrounding the constraining layer; and,
an outer protection layer adjacent to and surrounding the strengthening layer, wherein an end of the outer layer is connected to a strain relief device to provide expansion protection to the cable assembly and to minimize strain on the cable assembly, and further wherein an end of the strain relief device is connected to an optical fiber module.

17. A self healing optical fiber cable assembly comprising:
an elongated optical fiber core having an integrated cladding and buffer layer surrounding the optical fiber core;
a sealing layer adjacent to and surrounding the integrated cladding and buffer layer, wherein the sealing layer seals any microcracks or defects in the integrated cladding and buffer layer and in the optical fiber core;
a constraining layer adjacent to and surrounding the sealing layer; a strengthening layer adjacent to and surrounding the constraining layer; and,
an outer protection layer adjacent to and surrounding the strengthening layer, wherein the outer protection layer is corrugated and wherein an end of the outer layer is connected to a strain relief device to provide expansion protection to the cable assembly and to minimize strain on the cable assembly, and further wherein an end of the strain relief device is connected to an optical fiber module.

18. The assembly of claim 16 wherein the optical fiber core comprises a material selected from the group consisting of glass, plastic, and electrical metal wire.

19. The assembly of claim 16 wherein the sealing layer is adjacent an entire length of the integrated cladding and buffer layer.

20. The assembly of claim 16 wherein the constraining layer comprises a polymeric material selected from the group consisting of polyolefin, polyolefin copolymer, ethylene vinyl acetate (EVA), heat shrink polyetheretherketone (PEEK), and polyvinylidene fluoride (PVDF).

21. The assembly of claim 16 wherein the strengthening layer comprises a fiber material selected from the group consisting of poly paraphenylene terephthalamide, graphite, and fiber glass.

22. The assembly of claim 16 wherein the outer protection layer comprises a thermal plastic material selected from the group consisting of polyetheretherketone (PEEK), ethylene tetrafluoroethylene (ETFE), and polyvinylidene fluoride (PVDF).

23. A self healing optical fiber cable assembly comprising:
an elongated optical fiber core having a cladding layer adjacent to and surrounding the optical fiber core;
a sealing layer adjacent to and surrounding the cladding layer, wherein the sealing layer seals any microcracks or defects in the cladding layer and the optical fiber core and further wherein the sealing layer comprises a hot melt thermal plastic material comprising ethylene vinyl acetate (EVA); and,
an outer protection layer adjacent to and surrounding the sealing layer, wherein an end of the outer layer is connected to a strain relief device to provide expansion protection to the cable assembly and to minimize strain on the cable assembly, and further wherein an end of the strain relief device is connected to an optical fiber module.

24. The assembly of claim 23 wherein the optical fiber core comprises a material selected from the group consisting of glass, plastic, and electrical metal wire.

25. The assembly of claim 23 wherein the outer protection layer comprises a thermal plastic material selected from the group consisting of polyetheretherketone (PEEK), ethylene tetrafluoroethylene (ETFE), and polyvinylidene fluoride (PVDF).

26. A method for making a self healing optical fiber cable assembly comprising the steps of:
providing an elongated optical fiber core having a cladding layer and a buffer layer surrounding the optical fiber core;
positioning a thermal plastic outer protection layer over the surrounded optical fiber core;
inserting a hot melt sealing material over an entire length of the surrounded optical fiber core, wherein the hot melt sealing material seals any microcracks or defects in the surrounded optical fiber core and further wherein the hot melt sealing material comprises a thermal plastic material comprising ethylene vinyl acetate (EVA);
connecting an end of the outer protection layer to a strain relief device to provide expansion protection to the cable assembly and to minimize strain on the cable assembly; and,
connecting an end of the strain relief device to a optical fiber module.

27. The method of claim 26 further comprising the step after the step of positioning the thermal plastic outer protection layer over the surrounded optical fiber core, of positioning a constraining layer over the surrounded optical fiber core between the surrounded optical fiber core and the outer protection layer.

28. The method of claim 27 further comprising the step after the step of positioning the constraining layer over the surrounded optical fiber core, of positioning a strengthening layer between the constraining layer and the outer protection layer.

29. The method of claim 26 wherein the optical fiber core comprises a material selected from the group consisting of glass, plastic, and electrical metal wire.

30. The assembly of claim 26 wherein the outer protection layer comprises a thermal plastic material selected from the group consisting of polyetheretherketone (PEEK), ethylene tetrafluoroethylene (ETFE), and polyvinylidene fluoride (PVDF).

* * * * *